(12) United States Patent
Hui et al.

(10) Patent No.: US 9,350,645 B2
(45) Date of Patent: May 24, 2016

(54) SIMULTANEOUS ACKNOWLEDGMENTS FOR MULTICAST PACKETS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 268 days.

(21) Appl. No.: 13/920,758

(22) Filed: Jun. 18, 2013

(65) Prior Publication Data

US 2015/0207725 A1    Jul. 23, 2015

(51) Int. Cl.
| | |
|---|---|
| *H04L 12/761* | (2013.01) |
| *H04L 12/18* | (2006.01) |
| *H04W 72/00* | (2009.01) |
| *H04L 1/00* | (2006.01) |
| *H04W 28/06* | (2009.01) |
| *H04W 72/02* | (2009.01) |

(52) U.S. Cl.
CPC *H04L 45/16* (2013.01); *H04L 1/00* (2013.01); *H04L 12/189* (2013.01); *H04L 12/1863* (2013.01); *H04W 28/06* (2013.01); *H04W 72/005* (2013.01); *H04W 72/02* (2013.01)

(58) Field of Classification Search
CPC ..... H04L 45/16; H04L 45/14; H04L 45/7453; H04W 40/28; H04W 40/023; H04W 40/02
See application file for complete search history.

(56) References Cited

U.S. PATENT DOCUMENTS

| | | | |
|---|---|---|---|
| 6,990,098 B1 * | 1/2006 | Eberle et al. | 370/390 |
| 7,212,490 B1 | 5/2007 | Kao et al. | |
| 8,027,284 B2 * | 9/2011 | Kozat et al. | 370/312 |
| 8,089,911 B2 * | 1/2012 | Huang et al. | 370/312 |
| 8,218,661 B2 * | 7/2012 | Bhatti et al. | 375/260 |
| 8,340,125 B2 * | 12/2012 | Mueller | 370/468 |
| 8,891,475 B2 * | 11/2014 | Lee | H04W 24/00 370/329 |
| 2006/0212551 A1 | 9/2006 | Kao et al. | |
| 2007/0280132 A1 | 12/2007 | Oz et al. | |
| 2009/0013256 A1 | 1/2009 | Friedman et al. | |
| 2009/0247084 A1 * | 10/2009 | Palanki | 455/63.1 |
| 2010/0202347 A1 * | 8/2010 | Sridhara et al. | 370/328 |
| 2010/0293223 A1 | 11/2010 | Bhardwaj et al. | |
| 2013/0163444 A1 * | 6/2013 | Tee et al. | 370/252 |

OTHER PUBLICATIONS

Dutta, et al., "SMACK—A SMart ACKnowledgment Scheme for Broadcast Messages in Wireless Networks", SIGCOMM, Aug. 17-21, 2009, pp. 15-26, ACM, Barcelona, Spain.

* cited by examiner

*Primary Examiner* — Rasheed Gidado
(74) *Attorney, Agent, or Firm* — Parker Ibrahim & Berg LLC; James M. Behmke; Stephen D. LeBarron

(57) ABSTRACT

In one embodiment, a multicast communication is received at a particular node of a plurality of nodes receiving the multicast communication in a network. The particular node selects a subset of subcarriers using a probabilistic data structure, such that each of the plurality of nodes selects a respective subset of subcarriers using the probabilistic data structure. The particular node transmits an acknowledgement of receipt of the multicast communication on the subset of subcarriers selected by the particular node. The transmission occurs simultaneously with transmissions of acknowledgements from the other of the plurality of nodes.

18 Claims, 7 Drawing Sheets

SIMULTANEOUS ACKNOWLEDGMENTS FOR MULTICAST PACKETS

TECHNICAL FIELD

The present disclosure relates generally to computer networks, and, more particularly, to simultaneously acknowledging receipts of multicast packets.

BACKGROUND

Low-power and lossy networks (LLNs), e.g., sensor networks, have a myriad of applications, such as Smart Grid and Smart Cities. Because LLNs typically communicate over a broadcast/multicast medium, e.g., wireless, powerline communication (PLC), etc., it is possible to communicate a message to multiple neighbors simultaneously with a single transmission. In particular, multicast transmissions are often used for opportunistic routing, multi-path routing, or application-specific functions, which often have small latency requirements, e.g., Demand Response, lighting control, etc. Unlike unicast transmissions, however, existing LLN link technologies do not provide an efficient acknowledgment mechanism for multicast transmissions. Existing reliable multicast mechanisms for LLNs involve long delays due to the lack of an efficient acknowledgment mechanism.

BRIEF DESCRIPTION OF THE DRAWINGS

The objects, features, aspects, and advantages of the embodiments disclosed herein will become more apparent from the following detailed description when taken in conjunction with the following accompanying drawings.

Figure 1:
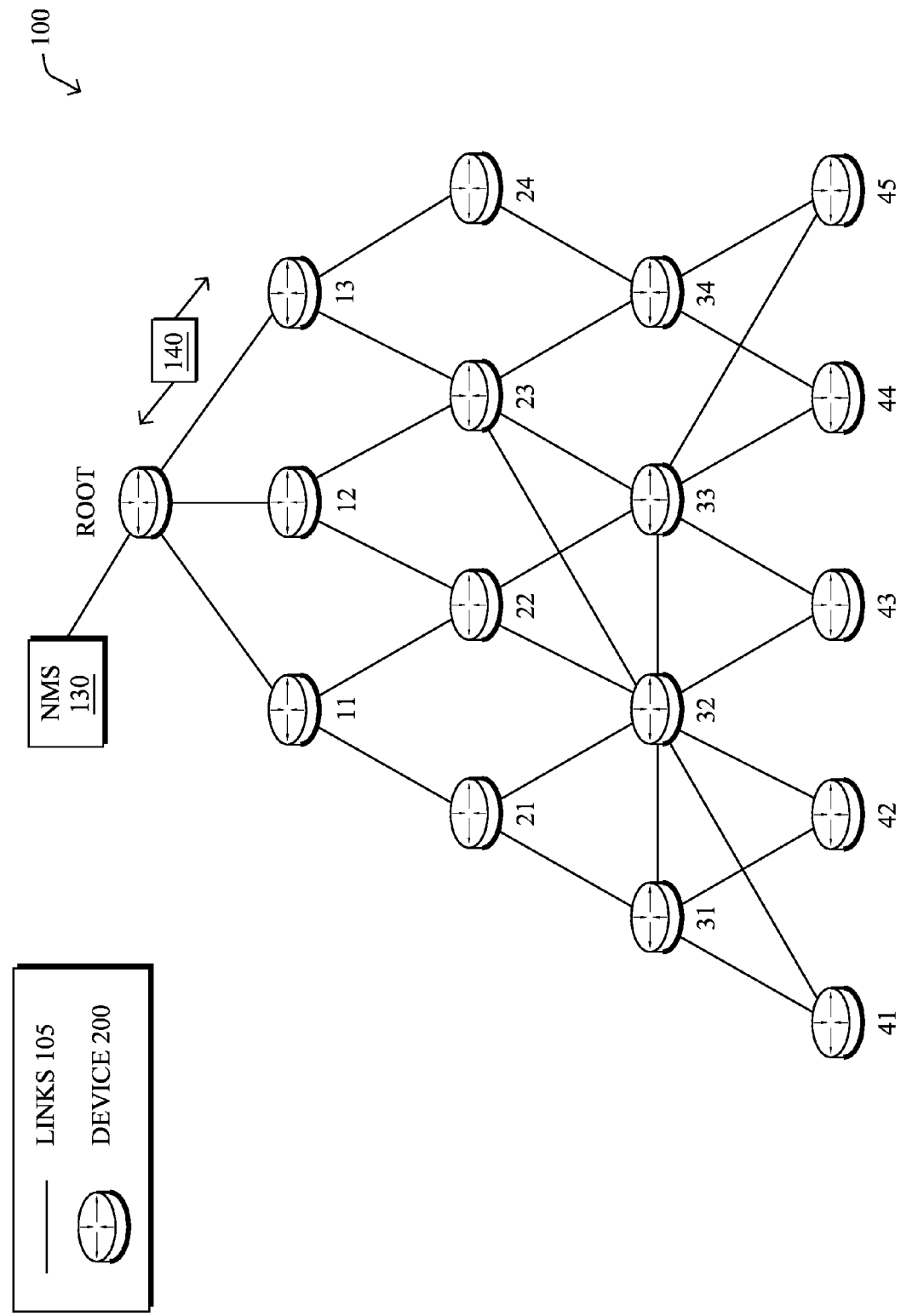
FIG. 1 illustrates an example communication network.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

Overview

According to the disclosed embodiments, receipts of multicast packets are acknowledged simultaneously. The embodiments illustratively include receiving a multicast communication at a particular node of a plurality of nodes receiving the multicast communication in a network. The particular node selects a subset of subcarriers using a probabilistic data structure, such that each of the plurality of nodes selects a respective subset of subcarriers using the probabilistic data structure. The particular node transmits an acknowledgement of receipt of the multicast communication on the subset of subcarriers selected by the particular node. The transmission occurs simultaneously with transmissions of acknowledgements from the other of the plurality of nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links, such as common carrier telephone lines, optical lightpaths, synchronous optical networks (SONET), synchronous digital hierarchy (SDH) links, or power-line communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators which may be responsible for, e.g., turning on/off an engine. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed, and bandwidth.

FIG. 1 is a schematic block diagram of an example computer network 100. Illustratively, computer network 100 comprises devices 200 (e.g., labeled as "root," "11," "12," . . . "45"), as described in FIG. 2 below, interconnected by communication links 105. For instance, the links 105 may be wired links or shared media (e.g., wireless links, PLC links, etc.) where certain devices 200, such as routers, sensors, computers, actuators, and the like, may be in communication with other nodes 200, based on distance, signal strength, current operational status, location, and the like. Of course, the communication links may interconnect the various network devices in any feasible configuration, and the links 105 as shown in FIG. 1 are depicted as such for illustration purposes only.

A network management server (NMS) 130, may be in communication with the network 100, such as via the root node (e.g., a field area router, FAR) over a WAN or cellular network. For the purposes of the present disclosure, the computer network 100 may be of any suitable type of network, including, but limited to, an LLN. Further, the devices 200 may be referred to as "devices" or "nodes" interchangeably.

Those skilled in the art will understand that any number of nodes, devices, links, etc. may be used in a computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the devices 200 of the computer network 100 using predefined network communication protocols such as certain known wired protocols, wireless protocols (e.g., IEEE Std. 802.15.4, WiFi, Bluetooth®, etc.), LLN protocols, or other shared-media protocols where appropriate (e.g., PLC). In this context, a protocol consists of a set of rules defining how the nodes interact with each other.

Figure 2:
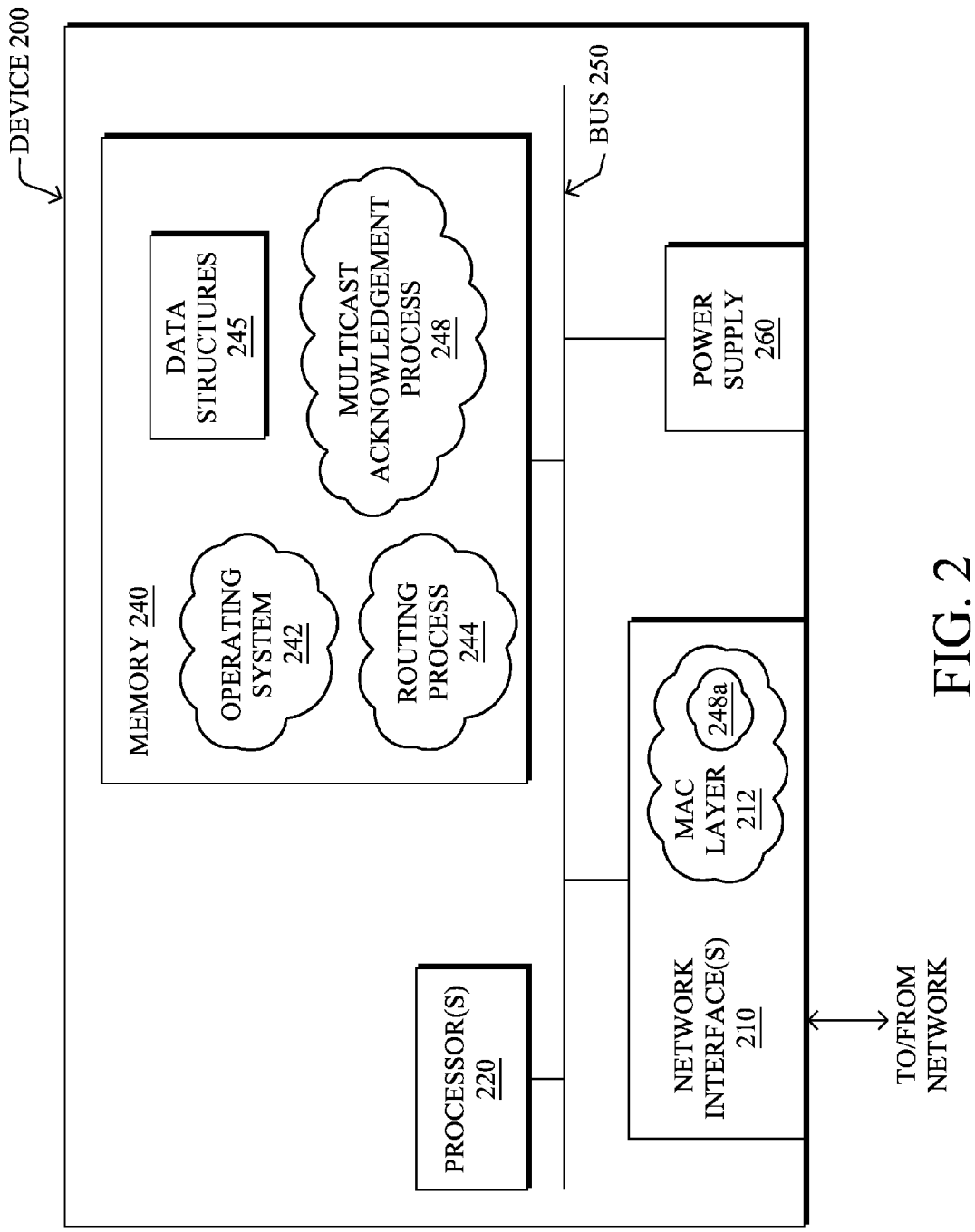
FIG. 2 illustrates an example network device/node.

FIG. 2 is a schematic block diagram of an example node/device 200 that may be used with one or more embodiments described herein, e.g., as shown in FIG. 1. The device may comprise one or more network interfaces 210 (e.g., wireless/channel-hopping), one or more processors 220, a memory 240, and a power supply 260 (e.g., plug-in, battery, etc.), interconnected by a system bus 250.

The network interface(s) 210, e.g., transceiver, contain the mechanical, electrical, and signaling circuitry for communicating data over wireless links 105 coupled to the network 100. The network interface may be configured to transmit and/or receive data using a variety of different communication protocols as noted above and as will be understood by those skilled in the art. Note that the device 200 may have multiple different types of network interfaces 210, e.g., wireless and wired/physical connections, and that the view herein is merely for illustration. In addition, the interface 210 may comprise an illustrative media access control (MAC) layer module 212 (and other layers, such as the physical or "PHY" layer, as would be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor(s) 220 and the network interface(s) 210 for storing software programs and data structures associated with the embodiments described herein. Note that certain devices may have limited memory or no memory (e.g., no memory for storage other than for programs/processes operating on the device). The processor(s) 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "multicast acknowledgement" process 248, as described in greater detail below. Note that while the multicast acknowledgement process 248 is shown in centralized memory 240, alternative embodiments provide for the asynchronous broadcast communication process to be specifically operated within the network interface(s) 210, such as a component of MAC layer 212 (process "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor(s) 220 to perform functions provided by one or more routing protocols, such as proactive or reactive routing protocols, as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR).

Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as low-power and lossy networks (LLNs). LLNs, e.g., certain sensor networks, may be used in a myriad of applications such as for "Smart Grid" and "Smart Cities." LLNs are comprised of anything from a few dozen and up to thousands or even millions of LLN routers, and support point-to-point traffic (e.g., between devices inside the LLN), point-to-multipoint traffic (e.g., from a central control point, such as the root node, to a subset of devices inside the LLN) and multipoint-to-point traffic (e.g., from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Due to their underlying attributes, LLNs face a number of challenges. For example, LLNs are a class of network in which both the routers and their interconnect are "constrained." This means that LLN routers typically operate with constraints, e.g., processing power, memory, and/or energy (e.g., batteries). Also, their interconnects are characterized by, for example, high loss rates, low data rates, and/or instability.

Additionally, LLNs communicate over a physical medium that is strongly affected by environmental conditions that change over time. Some examples include temporal changes in interference (e.g., other wireless networks or electrical appliances), physical obstruction (e.g., doors opening/closing or seasonal changes in foliage density of trees), and propagation characteristics of the physical media (e.g., temperature or humidity changes). The time scales of such temporal changes can range between milliseconds (e.g., transmissions from other transceivers) to months (e.g., seasonal changes of outdoor environment).

Moreover, low-cost and low-power designs limit the capabilities of the transceiver. In particular, LLN transceivers typically provide low throughput and typically support limited link margin. Therefore, the effects of interference and environmental changes to LLNs are visible to link and network protocols.

As noted above, because LLNs typically communicate over a broadcast/multicast medium, e.g., wireless (RF), PLC, etc., it is possible to communicate a message to multiple neighbors simultaneously with a single transmission. Broadcast transmissions are often used for discovering neighbors or disseminating messages to most/all devices within the network. Meanwhile, multicast transmissions are often used for opportunistic routing, multi path routing, or application-specific functions, which often have small latency requirements, e.g., Demand Response, lighting control, etc.

Unlike for unicast transmissions, existing LLN link technologies do not provide an efficient acknowledgment mechanism for broadcast or multicast transmissions. Existing reliable broadcast/multicast mechanisms for LLNs involve long delays due to the lack of an efficient acknowledgment mechanism. Having destinations send a unicast acknowledgment ("ack") back to the source results in the well-known "ack-implosion" problem. In many cases, any attempts at greater reliability are performed at the upper layers of the network stack, e.g., using Trickle, coding techniques, etc.

To help provide greater throughput and robustness, Orthogonal Frequency Division Multiplexing (OFDM) is a method of encoding digital data on multiple carrier frequencies simultaneously. OFDM utilizes additional bandwidth by allowing transmission of multiple data streams across orthogonal subcarrier simultaneously to increase throughput. Both IEEE 802.15.4g and IEEE P1901.2 standardize the use of OFDM. Moreover, the use of OFDM has been expanding into different link technologies, including those targeted for LLNs.

Existing networking methodologies attempt to implement an acknowledgment mechanism for multicast packets using OFDM by assigning any client device which receives a multicast communication a unique "membership ID" within [0,N), where N is the number of possible subcarriers. Upon receipt of the multicast communication, a receiving device transmits an acknowledgement on the subcarrier indexed by the device's unique membership ID.

Unfortunately, such methodologies may not be feasible within LLNs. First, the membership ID space is limited by the number of subcarriers. LLNs typically operate with node densities of hundreds of neighbors and network sizes in the thousands. Second, the membership ID assignment essentially requires the transmitter and receiver to synchronize on unique identifiers. In a mesh network, each device must learn the membership ID of any neighboring node that it wishes to broadcast messages to. This can cause significant inefficiencies in highly dense networks, such as LLNs.

Simultaneous Acknowledgments for Multicast Packets

The current techniques provide an efficient acknowledgment mechanism for multicast packets within communication networks, such as LLNs. The disclosed embodiments remove the need for synchronizing membership IDs, and thus any limitation on the number of client devices, by using a probabilistic data structure to determine a subset of subcarriers on which to transmit an acknowledgment signal, and by allowing the acknowledgments transmitted from different nodes to collide within one or more subcarriers.

In particular, the techniques herein use a probabilistic data structure to simultaneously acknowledge receipts of multicast packets at a plurality of network nodes. Rather than broadcasting an acknowledgement packet across all subcarriers, or transmitting the packet on a single subcarrier based on a synchronized membership ID, the acknowledgement is sent simply by sending a signal on a select subset of subcarriers. The subset is chosen by using a probabilistic data structure, such as a Bloom filter, based on a unique device identifier, and, optionally, a time-varying component (e.g., global time) or information within the multicast packet itself. Having all intended receivers sending the acknowledgment simultaneously effectively implements a bitwise-OR at the PHY layer in the frequency domain. A device then processes the acknowledgment signal as a union of Bloom filters from each intended receiver.

Specifically, according to the disclosed embodiments, a multicast communication may be received at a particular node of a plurality of nodes receiving the multicast communication in a network. The particular node selects a subset of subcarriers using a probabilistic data structure, such that each of the plurality of nodes selects a respective subset of subcarriers using the probabilistic data structure. The particular node transmits an acknowledgement of receipt of the multicast communication on the subset of subcarriers selected by the particular node. The transmission occurs simultaneously with transmissions of acknowledgements from the other of the plurality of nodes.

Illustratively, the techniques described herein may be performed by hardware, software, and/or firmware, such as in accordance with the multicast acknowledgement process 248, which may contain computer executable instructions executed by the processor(s) 220 (or an independent processor of network interface(s) 210) to perform functions relating to the techniques described herein. Generally speaking, the techniques described herein may be processed by similar components that are understood in the art to be operable to acknowledge receipts of packets.

Operationally, the techniques herein generally relate to, but are not limited to, applying probabilistic data structures, such as Bloom filters, in the selection of subcarriers for simultaneous transmission of acknowledgements, and allowing collisions of the acknowledgements on one or more subcarriers, to implement an efficient acknowledgment mechanism from multiple devices. Subsequently, the multicast transmitting device may determine which receivers acknowledged receipt by calculating the subcarriers on which the acknowledgment signals were received.

Figure 3:
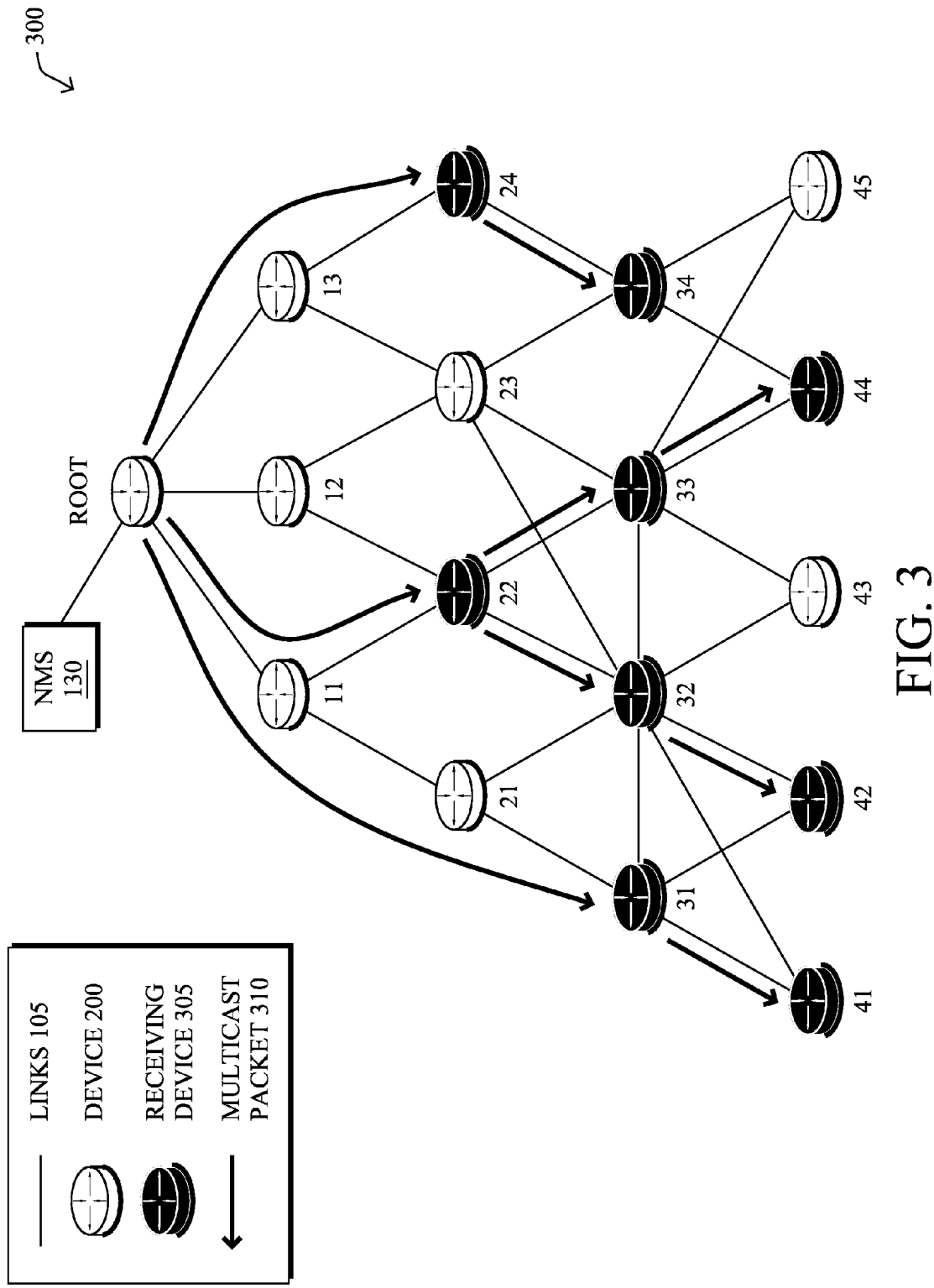
FIG. 3 illustrates an example network comprised of a plurality of nodes configured to receive a multicast communication.

FIG. 3 illustrates an example network comprised of a plurality of nodes configured to receive a multicast communication. As shown in FIG. 3, the network 300 comprises devices 200 interconnected to one another via communication links 105, in the manner illustrated in FIG. 1.

A transmitting device, such as node 32, may be configured to transmit a multicast message 310, e.g., packet, to a plurality of devices 200 (e.g., nodes 22, 31, 33, 41, and 42). Note that while the illustrated transmitter is node 32 transmitting messages in both directions on the DAG, it is also possible that a multicast transmission be used to disseminate a message only in the downward direction (e.g., away from a root node), such as to distribute a message from a parent node to a plurality of child nodes. For instance, as noted above, because LLNs typically communicate over a broadcast/multicast medium, e.g., RF, PLC, etc., it is possible to communicate a message to multiple neighbors simultaneously with a single transmission. Multicast transmissions are often used for opportunistic routing, multi path routing, or application-specific functions, which often have small latency requirements, e.g., Demand Response, lighting control, etc. On the other hand, broadcast transmissions are often used for discovering neighbors or disseminating messages to most/all devices within the network. Although the present disclosure is directed primarily toward multicast communications, the disclosed embodiments may be applicable to broadcast communications, as well. Such an implementation would be understood by one of ordinary skill in the art. Further, while the transmitting device as shown in FIG. 3 is node 32, any suitable broadcast/multicast transmitting device may be utilized for the purposes of the disclosed embodiments.

The receiving devices 305, e.g., nodes 22, 31, 33, 41, and 42, are designated as recipients of the multicast communication 310. Any suitable configuration of the receiving devices 305 may be utilized. The receiving devices may be determined, e.g., based on a particular application. For instance, in the case of an advanced metering infrastructure (AMI) related application, all meter devices may receive a multicast message from a transmitting device, such as an NMS, a field area router (FAR), or the like, indicating that a meter read should be performed. The receiving devices 305 may be of any type suitable type for receiving a multicast transmission, such the device 200, as shown in FIG. 2.

Figure 4:
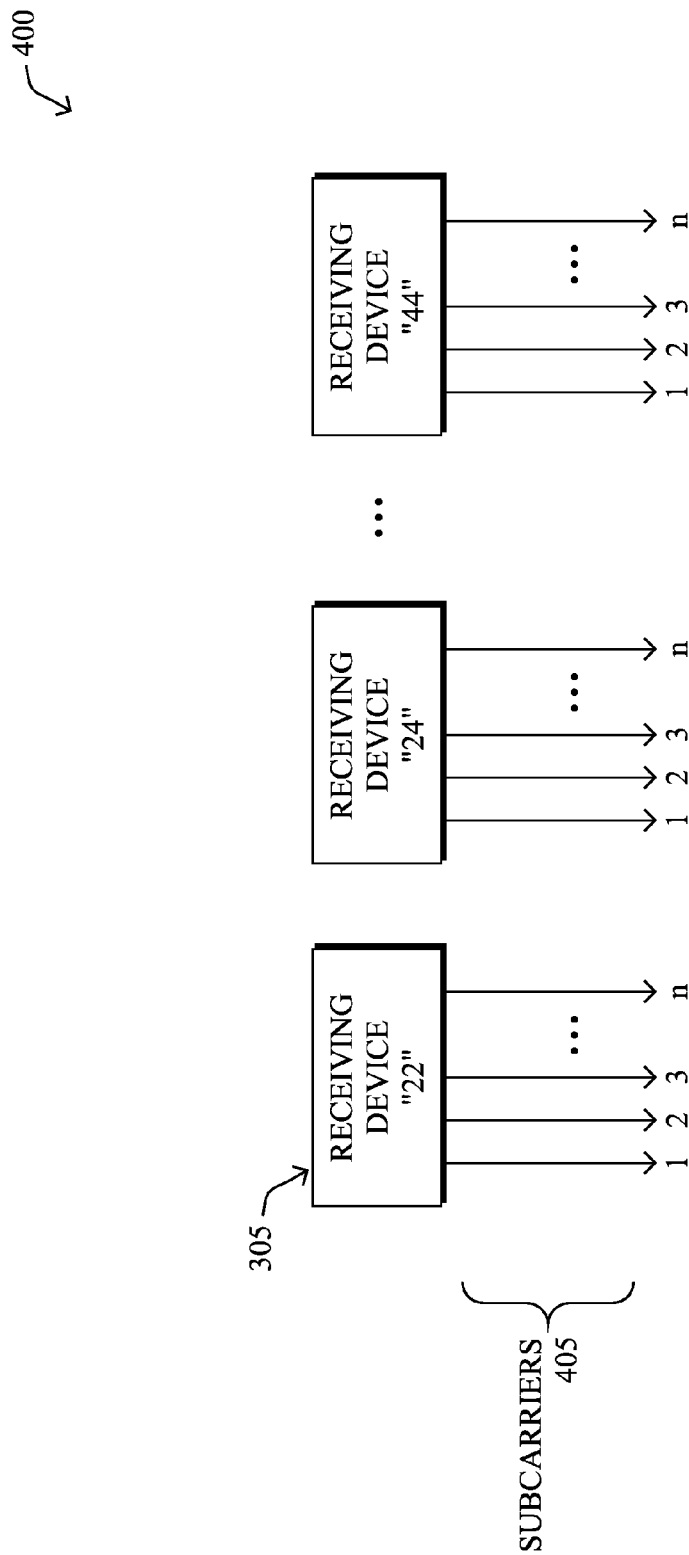
FIG. 4 illustrates an example of subcarrier selection using a probabilistic data structure.

FIG. 4 illustrates an example of subcarrier selection using a probabilistic data structure. As shown in FIG. 4, the network 400 comprises receiving devices 305 and subcarriers 405, on which the receiving devices may transmit an acknowledgement of receipt of the multicast data packets 310 to the original sender.

The receiving devices 305 may transmit an acknowledgment signal simultaneously on one or more subcarriers 405. The one or more subcarriers 405, on which each acknowledgement signal is to be transmitted, is selected by each receiving device 305 individually. Thus, each receiving device 305 may transmit the acknowledgement signal on a respectively selected subset of subcarriers.

Each receiving device 305 may select the subset of subcarriers 405 from among all possible subcarriers, e.g., "1", "2", "3" . . . "n", in the network 400. Because each receiving device 305 selects a subset of subcarriers 405 amongst the entire array of subcarriers, substantial overlap in subcarrier usage is possible. In other words, it is possible for multiple receiving devices 305 to select one or more of the same subcarriers on which to transmit acknowledgement(s). In such case, a carrier will be sent by multiple receiving devices 305 on the same subcarrier, thereby causing potential transmission collisions. However, for the purposes of the present disclosure, collisions are permitted to occur on the individual subcarriers. By utilizing collisions, the disclosed embodiments may take advantage of particular properties of probabilistic data structures, e.g., Bloom filters, used for selecting the subcarriers, as discussed in further detail below. Notably, if the set of intended receiving devices is small, the set of subcarriers simultaneously used by multiple devices will also be small.

The subcarriers 405 on which each acknowledgement signal is to be transmitted may be selected by each receiving device 305 using a probabilistic data structure, such as a Bloom filter. Importantly, the Bloom filter is ideal for use within the context of the present disclosure due to its space and time-efficiency; thus, the Bloom filter is well-suited for "constrained" devices, as are typically employed in LLNs. Although the present disclosure is directed primarily to the application of the Bloom filter, any suitable probabilistic data structure may be utilized, as would be evident to a person of ordinary skill in the art.

The Bloom filter is a space-efficient probabilistic data structure that may be used to test whether an element is a member of a set. An empty Bloom filter is a bit array of M bits, all set to 0. There must be K different hash functions defined, each of which maps an element to one of the M array positions, i.e., bit-positions, with a uniform random distribution. To add an element, the element should be inputted to each of the K hash functions to get K bit-positions, and those K bit-positions are set to 1. To test whether an element is in the set, the element should be inputted to each of the K hash functions to get K bit-positions. If any of the K bit-positions are 0, then the element is not in the set. Conversely, if all bit-positions are 1, then the element is in the set (provided that the indication is not a false positive, as described in further detail below). The number of bits per element depends on the number of inserted elements and the desired false positive rate. Classic Bloom filters use $1.44*\log\_2(1/R)$ bits of space per element, where R is the desired false positive rate of the Bloom filter. For instance, to support R<1%, the Bloom filter requires approximately 9.6 bits per element.

For the purposes of the present disclosure, a Bloom filter may operate on an N-bit array, where N is the number of available subcarriers 405. The bit-positions may determine the subcarriers on which a particular receiving device 305 should transmit when sending an acknowledgment signal. Each receiving device 305 only transmits using the K subcarriers identified by the K hash functions of the Bloom filter. For example, the bit-positions set to a value of 1 may indicate the selected subcarriers, or in other words, the subcarriers on which to transmit an acknowledgement; whereas, the bit-positions set to a value of 0 may indicate the non-selected subcarriers. Therefore, upon receiving a multicast packet 310 that requests an acknowledgment in response, the receiving device 305 may transmit the acknowledgment signal on all subcarriers that have a 1 in the corresponding bit-vector. The number of bits set to 1 can be no greater than the number of hash functions used with the Bloom filter.

In addition, the receiving devices 305 may each compute their bit-positions, which define their respectively selected subset of subcarriers, based on a unique identifier. In this regard, a receiving device 305 may run the unique identifier through the Bloom filter hash functions to set the appropriate bits in the array. Each hash function takes the unique identifier as input and outputs an integer within the range [1,N], whereby N is the number of available OFDM subcarriers. Any suitable unique identifier may be utilized, such as, for example, a 64-bit global identifier as described in IEEE EUI-64. This step may be performed once during initialization of the subcarrier selection process for each receiving device 305. Significantly, assigning a unique identifier to each receiving device 305 eliminates any need for in-band synchronization between the transmitting and receiving devices, which would increase necessary computing time and decrease overall efficiency. Because the K hash functions of the Bloom filter may be utilized to facilitate the selection of subcarriers for each receiving device 305, and the K hash functions of the Bloom filter are known to all devices, there is no need to negotiate which subcarriers to use.

Moreover, the receiving devices 305 may each compute their bit-positions based on a time-varying component known both to the transmitting device (the NMS 130, for example) and the receiving device 305, e.g., global time. Alternatively, the receiving devices 305 may each compute their bit-positions based on information contained in the multicast packet 310, such as a random number. The information may be deliberately included in the multicast packet 310 by the transmitting device. It should be understood that the time-varying component and/or information contained in the multicast packet 310 may be utilized by the receiving devices 305 to compute the bit-positions in conjunction with the unique identifier, as described above.

Problematically, existing networking methodologies are susceptible to both narrowband and wideband interference. For example, because activity on a single subcarrier can falsely indicate that a receiving device sent an acknowledgement, narrowband interference can cause false positives; and by the same token, wideband interference can cause a contiguous range of subcarriers to appear active. However, by utilizing a Bloom filter, or other similar probabilistic data structure with multiple hash functions, in the manner described herein, a natural method is provided for addressing both narrowband and sideband interference. Using K>1 hash functions provides the same effect as assigning multiple subcarriers to each client/receiving device, without having the overhead of explicitly negotiating the subcarriers between the devices. Because the K hash functions are essentially random functions, any narrowband interference must occur at exactly the same frequency. Further, the active subcarriers are distributed across the frequency range allowing for inactive subcarriers in-between, i.e., subcarrier "gaps." This facilitates detection of wideband interference in situations where acknowledgements are being sent over a contiguous range of subcarriers.

As referenced above, a common property of Bloom filters is that they may result in false positives, e.g., where the Bloom filter falsely determines that an element is part of a set when, in fact, it is not. However, with the particular application of the Bloom filter described herein, the transmitting device knows all of the intended receiving devices 305, which may thus eliminate false positives. For example, before sending a multicast message, the transmitting device may compute the Bloom filter and determine whether one or more entries, i.e., recipients, map to the same set of bits. If so, the transmitting device may introduce a "seed" to ensure that no false positives occur. In this regard, the transmitting device may include a random value in the multicast data packet 310, as described in detail above. Therefore, rather than initializing each receiving device 305 in the Bloom filter by merely using the unique identifier, e.g., EUI-64, each receiving device may be initialized using the tuple {EUI-64, seed}, where the seed derives from the information contained within the multicast packet 310. As a result, prior to transmitting the message, the transmitting device may prevent false positives by selecting an appropriate seed such that a false positive does not occur.

Figure 5:
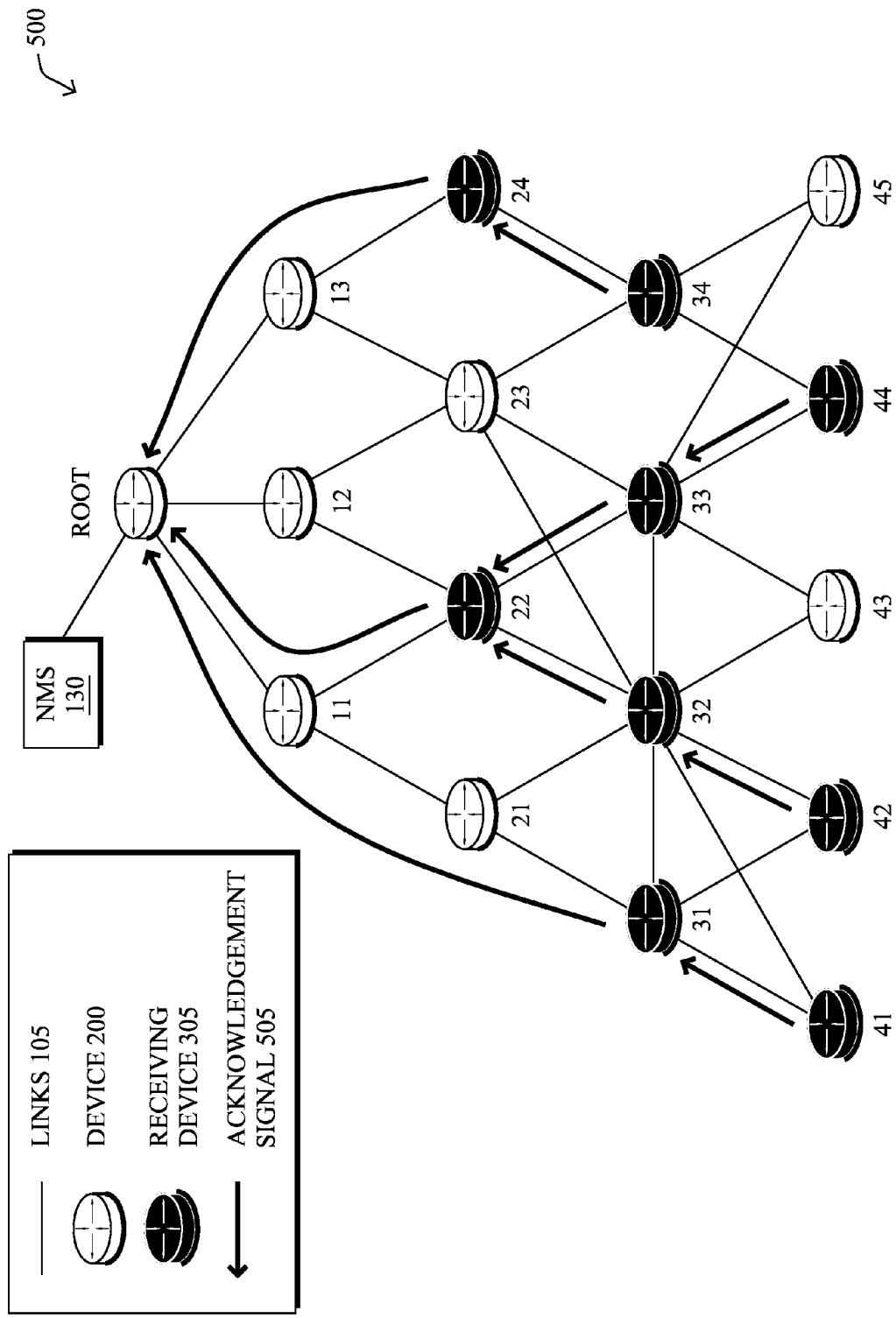
FIG. 5 illustrates an example of simultaneous acknowledgment transmissions.

FIG. 5 illustrates an example of simultaneous acknowledgment transmissions. As shown in FIG. 5, the network 500 comprises devices 200 interconnected to one another via communication links 105, in the manner illustrated in FIG. 1.

As described in detail above, the receiving devices 305 receive a multicast communication from a transmitting device, e.g., all except node 42. The receiving devices 305 also select a subset of subcarriers using a probabilistic data structure, e.g., a Bloom filter, from among all available subcarriers in the network. Subsequently, each of the receiving devices 305 simultaneously transmit an acknowledgement of receipt 505 of the multicast communication 310 to the transmitting device using only the subset of subcarriers respectively selected by each receiving device.

Unlike existing networking methodologies, the acknowledgement 505 need not be an entire data packet, containing a preamble, MAC header, MAC payload, etc. Instead, each acknowledgement 505 may merely be represented as a carrier signal on a subcarrier. This is because in order to evaluate the acknowledgement 505, each receiving device 305 may simply indicate which of the K subcarriers were selected using the probabilistic data structure. To achieve this, a receiving device 305 may transmit a carrier, i.e., a single bit of information, on each of the K subcarriers (indicating a 1-bit). All other subcarriers not supporting an active transmission may represent a 0-bit, i.e., no transmission occurs on the non-selected subcarriers. As a result, the complexity in receiving an acknowledgement 505 and identifying its sender is reduced to merely determining whether there is an active carrier on a given subcarrier. Thus, rather than having to detect a preamble, decode the header and payload, and pass a cyclic redundancy check (CRC), as in the case of a receiving an acknowledgement in the form of a data packet, the disclosed embodiments merely utilize a "yes/no" answer as to whether a subcarrier is being used.

As referenced above, when the receiving devices 305 simultaneously transmit their respective acknowledgements 505, collisions may occur. In other words, a carrier may be sent by multiple devices on the same subcarrier. However, for the purposes of the present disclosure, such collisions may be allowed. Allowing acknowledgment collisions decreases overall computing time by eliminating the need to synchronize subcarrier selection between the various receiving devices 305. Notably, an interesting property of Bloom filters is that the union can be computed by taking the bitwise-OR of the bit-vectors. Thus, the multicast acknowledgement system described herein may take advantage of the fact that Bloom filters can be combined using a bitwise-OR operation by effectively performing a bitwise-OR using the PHY layer. In the illustration shown in FIG. 5, for instance, assume that based on the subcarriers received at the transmitting device 32, it can be determined (e.g., based on allowed collisions and probabilistic data structure application) that all intended receiver nodes except node 42 received the multicast communication. (The transmitting node 32 may then decide how to respond to this information in a conventional manner, such as retransmitting the multicast message or sending out a unicast message to the non-acknowledged destinations.)

Figure 6:
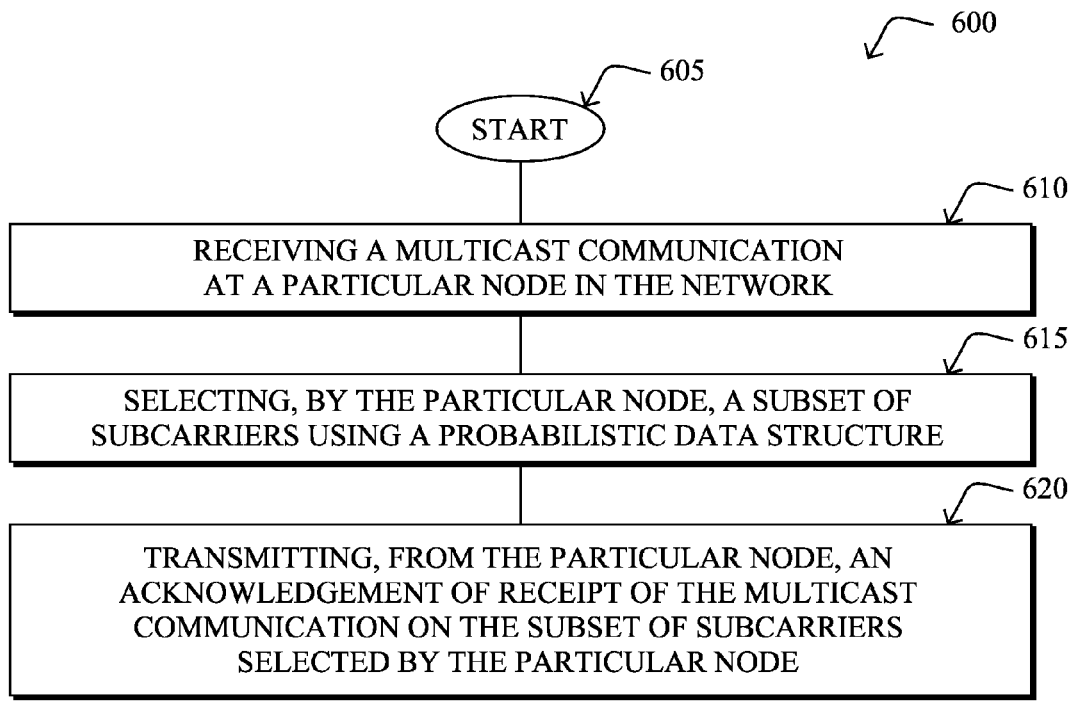
FIG. 6 illustrates an example simplified procedure for transmitting simultaneous acknowledgments of multicast packets in a communication network.

FIG. 6 illustrates an example simplified procedure 600 for transmitting simultaneous acknowledgments of multicast packets in a communication network. As shown in FIG. 6, the procedure 600 may start at step 605, continue to step 610, and so forth, where, as described in greater detail above, acknowledgements of receipt of a multicast communication may be simultaneously transmitted. Although FIG. 6 depicts steps in a particular order, it should be understood that the depicted embodiment is not limiting, and the particular order is depicted merely for illustration purposes.

At Step 610, the procedure 600 includes receiving a multicast communication at a particular node in a network. The particular node is a node of a plurality of nodes receiving the multicast communication. A transmitting device, such as an NMS, may be configured to transmit a multicast message, e.g., packet, to a plurality of devices, e.g., receiving devices. Because LLNs typically communicate over a broadcast/multicast medium, e.g., RF, PLC, etc., it is possible to communicate a message to multiple neighbors simultaneously with a single transmission. Multicast transmissions are often used for opportunistic routing, multi path routing, or application-specific functions, which often have small latency requirements, e.g., Demand Response, lighting control, etc. The receiving devices are designated as recipients of the multicast communication. Any suitable configuration of the receiving devices may be utilized. The receiving devices may be determined, e.g., based on a particular application. Any suitable transmission route along the communication links may be utilized to deliver the multicast data packets to the receiving devices. The transmission route may be determined by the particular networking protocol being utilized, such as wired protocols, wireless protocols (e.g., IEEE Std. 802.15.4, WiFi, Bluetooth®, etc.), LLN protocols, or other shared-media protocols where appropriate (e.g., PLC).

At Step 615, the procedure 600 further includes selecting, by the particular node, a subset of subcarriers using a probabilistic data structure. Each of the plurality of nodes selects a respective subset of subcarriers using the probabilistic data structure. Prior to transmission of the multicast receipt acknowledgement(s), the subset of subcarriers, on which each acknowledgement signal is to be transmitted, is selected by each receiving device individually. Each receiving device may select the subset of subcarriers from among all possible subcarriers in the network. The subcarriers may be selected using a probabilistic data structure, such as a Bloom filter. The Bloom filter is ideal for use within the context of the present disclosure due to its space and time-efficiency; thus, the Bloom filter is well-suited for "constrained" devices, as are typically employed in LLNs.

For the purposes of the present disclosure, a Bloom filter may operate on an N-bit array, where N is the number of available subcarriers. The bit-positions may determine the subcarriers on which a particular receiving device should transmit when sending an acknowledgment signal. Each receiving device only transmits using the K subcarriers identified by the K hash functions of the Bloom filter. For example, the bit-positions set to a value of 1 may indicate the selected subcarriers, or in other words, the subcarriers on which to transmit an acknowledgement; whereas, the bit-positions set to a value of 0 may indicate the non-selected subcarriers. Therefore, upon receiving a multicast packet from the NMS, or otherwise, that requests an acknowledgment in response, the receiving device may transmit the acknowledgment signal on all subcarriers that have a 1 in the corresponding bit-vector. The number of bits set to 1 can be no greater than the number of hash functions used with the Bloom filter.

At Step 620, the procedure 600 further includes transmitting, from the particular node, an acknowledgement of receipt of the multicast communication on the subset of subcarriers selected by the particular node. The transmission occurs simultaneously with transmissions of acknowledgements from the other of the plurality of nodes. After receiving a multicast communication and selecting a subset of subcarriers, each of the receiving devices may simultaneously transmit an acknowledgement of receipt of the multicast communication to the transmitting device using only the subset of subcarriers respectively selected by each receiving device. Each acknowledgement may merely be represented as a carrier signal on a subcarrier. To achieve this, a receiving device may transmit a carrier, i.e., a single bit of information, on each of the K subcarriers (indicating a 1-bit). All other subcarriers not supporting an active transmission may represent a 0-bit, i.e., no transmission occurs on the non-selected subcarriers. As a result, the complexity in receiving an acknowledgement and identifying its sender is reduced to merely determining whether there is an active carrier on a given subcarrier.

Figure 7:
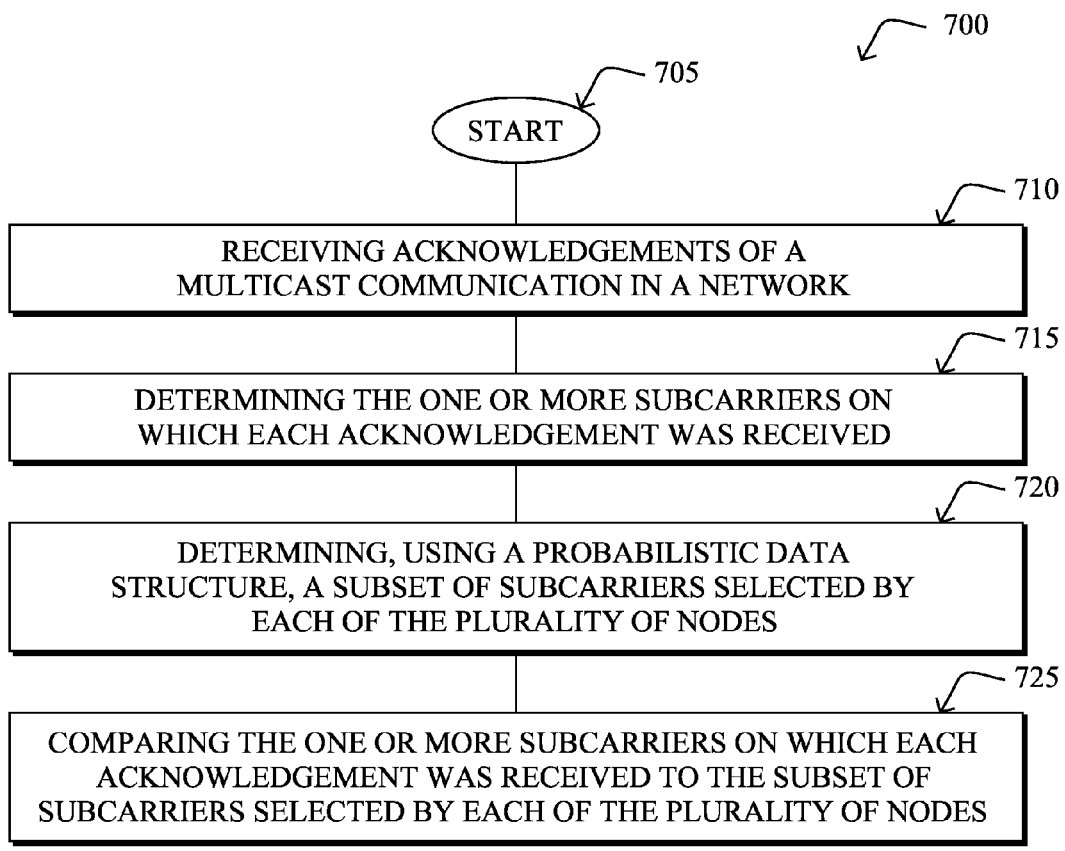
FIG. 7 illustrates an example simplified procedure for receiving the simultaneous acknowledgments of multicast packets in a communication network and determining the identities of the transmitting nodes.

FIG. 7 illustrates an example simplified procedure 700 for receiving the simultaneous acknowledgments of multicast packets in a communication network and determining the identities of the transmitting nodes. As shown in FIG. 7, the procedure 700 may start at step 705, continue to step 710, and so forth, where, as described in greater detail above, simultaneously transmitted acknowledgements of receipt of a multicast communication may be received and evaluated by a transmitting device. Although FIG. 7 depicts steps in a particular order, it should be understood that the depicted embodiment is not limiting, and the particular order is depicted merely for illustration purposes.

At Step 710, the procedure 700 includes receiving acknowledgements of a multicast communication in a network. The acknowledgements are simultaneously transmitted from a plurality of nodes on one or more subcarriers. The device which transmits the multicast communication, e.g., an NMS, root node, parent node, or otherwise, may request an acknowledgement of receipt from the intended recipients. The transmitting device then determines which receiving devices acknowledged receipt based on the subcarriers on which the acknowledgment signals were received, as described below.

At Step 715, the procedure 700 further includes determining the one or more subcarriers on which each acknowledgement was received. To this end, the transmitting device, i.e., the device receiving the acknowledgement, may process the acknowledgment signal(s) by receiving the composite time-domain signal across all OFDM subcarriers. Then, the device may perform a fast Fourier transform (FFT) to obtain the frequency domain representation. Other suitable methods of determining the one or more subcarriers on which each acknowledgement was received may equally be utilized.

At Step 720, the procedure 700 further includes determining, using a probabilistic data structure, a subset of subcarriers selected by each of the plurality of nodes. As described above, the Bloom filter may be used to determine which subcarriers are assigned to each node. Because the K hash functions of the Bloom filter are known to all devices, the transmitting device, may determine the subset of subcarriers respectively selected by each of the receiving devices by computing the bit-positions of the intended receivers. Therefore, using the Bloom filter in this manner improves over existing networking methodologies by eliminating any need to synchronize an ID between the sender and the receiver.

At Step 725, the procedure 700 further includes comparing the one or more subcarriers on which each acknowledgement was received to the subset of subcarriers selected by each of the plurality of nodes. After determining the subset of subcarriers respectively selected by each of the receiving devices, the transmitting device, i.e., an NMS, or otherwise, may check whether those subcarriers were in fact used for the acknowledgment. In the case of a single acknowledgement sender (e.g., node S) and an acknowledgement receiver (e.g., node R), R may: i) determine which K subcarriers were used to transmit the acknowledgement, ii) generate the K integers by applying S's unique identifier to the K hash functions, and iii) compare the K subcarrier indexes to the K integers. If the values match, R may then determine that S sent the acknowledgement.

In the case of multiple acknowledgement senders (e.g., nodes S1 and S2) and an acknowledgement receiver (e.g., node R), R may: i) determine which subcarriers were used to transmit the acknowledgement, ii) generate the K integers by applying S1 and S2's unique identifiers to the K hash functions, and iii) compares the K integers to the active subcarrier indexes. If all K integers for S1 are in the active subcarrier set, then R may determine that S1 sent an acknowledgement. Similarly, if all K integers for S2 are in the active subcarrier set, then R may determine that S2 sent an acknowledgement.

It should be understood that the steps shown in FIGS. 6 and 7 are merely examples for illustration, and certain steps may be included or excluded as desired. Further, while a particular order of the steps is shown, this ordering is merely illustrative, and any suitable arrangement of the steps may be utilized without departing from the scope of the embodiments herein. Moreover, while the procedures 600 and 700 are described separately, certain steps from each procedure may be incorporated into each other procedure, and the procedures are not meant to be mutually exclusive.

The techniques described herein, therefore, provide for an efficient means of simultaneously acknowledging receipts of multicast packets. As should be understood, a reliable multicast communication system is useful for many tasks in LLNs, including opportunistic forwarding, multi-path routing, and application-layer tasks (e.g., lighting control). Using a probabilistic data structure, such as a Bloom filter, to select a random subset of subcarriers removes the need to assign membership IDs and increases robustness to both narrow-band and wideband interference. Further, allowing all intended receiving devices to transmit their acknowledgment simultaneously significantly reduces the overhead (e.g., channel capacity, delay, etc.) of receiving and evaluating the acknowledgments.

While there have been shown and described illustrative embodiments that provide for simultaneously acknowledging receipts of multicast packets, it is to be understood that various other adaptations and modifications may be made within the spirit and scope of the embodiments herein. For example, the embodiments have been shown and described herein primarily with relation to LLN networks. However, the embodiments in their broader sense are not as limited, and may, in fact, be used with other types of networks and/or protocols.

Moreover, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a network, e.g., an LLN, a processor coupled to the at least one network interface, and a memory configured to store program instructions executable by the processor. Further, it is expressly contemplated that the components and/or elements described herein can be implemented as software being stored on a tangible, non-transitory computer-readable medium (e.g., disks/CDs/RAM/EEPROM/etc.) having program instructions executable by a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
 receiving acknowledgements of a multicast communication in a network, the acknowledgements being simultaneously transmitted from a plurality of nodes on one or more subcarriers, wherein each of the one or more subcarriers are selected using a Bloom filter; and
 determining an identity of each of the plurality of nodes based on the received acknowledgements by:
  determining the one or more subcarriers on which each acknowledgement was received,
  determining, using a probabilistic data structure, a subset of subcarriers selected by each of the plurality of nodes, and
  comparing the one or more subcarriers on which each acknowledgement was received to the subset of subcarriers selected by each of the plurality of nodes.

2. The method according to claim 1, wherein the selected subset of subcarriers is based on a node identifier that is unique to the particular node.

3. The method according to claim 2, wherein the selected subset of subcarriers is further based on a time-varying component.

4. The method according to claim 2, wherein the selected subset of subcarriers is further based on information contained within the multicast communication.

5. The method according to claim 1, wherein an acknowledgement received from a particular node collides with transmissions of acknowledgements from the other of the plurality of nodes.

6. The method according to claim 1, wherein the acknowledgements received from the a multicast communication are carrier signals on each of the subset of subcarriers.

7. An apparatus, comprising:
 one or more network interfaces that communicate with a network;
 a processor coupled to the one or more network interfaces and configured to execute a process; and
 a memory configured to store program instructions which contain the process executable by the processor, the process comprising:
  receiving acknowledgements of a multicast communication in the network, the acknowledgements being simultaneously transmitted from a plurality of nodes on one or more subcarriers; and
  determining an identity of each of the plurality of nodes based on the received acknowledgements by:
   determining the one or more subcarriers on which each acknowledgement was received,
   determining, using a probabilistic data structure, a subset of subcarriers selected by each of the plurality of nodes, and comparing the one or more subcarriers on which each acknowledgement was received to the subset of subcarriers selected by each of the plurality of nodes.

8. The apparatus according to claim 7, wherein the selected subset of subcarriers is based on a node identifier that is unique to the particular node.

9. The apparatus according to claim 8, wherein the selected subset of subcarriers is further based on a time-varying component.

10. The apparatus according to claim 8, wherein the selected subset of subcarriers is further based on information contained within the multicast communication.

11. The apparatus according to claim 7, wherein an acknowledgement received from a particular node collides with transmissions of acknowledgements from the other of the plurality of nodes.

12. The apparatus according to claim 7, wherein the acknowledgements received from the a multicast communication are carrier signals on each of the subset of subcarriers.

13. A tangible non-transitory computer readable medium storing program instructions that cause a computer to execute a process, the process comprising:
  receiving acknowledgements of a multicast communication in the network, the acknowledgements being simultaneously transmitted from a plurality of nodes on one or more subcarriers; and
  determining an identity of each of the plurality of nodes based on the received acknowledgements by:
    determining the one or more subcarriers on which each acknowledgement was received,
    determining, using a probabilistic data structure, a subset of subcarriers selected by each of the plurality of nodes, and
    comparing the one or more subcarriers on which each acknowledgement was received to the subset of subcarriers selected by each of the plurality of nodes.

14. The tangible non-transitory computer readable medium according to claim 13, wherein the selected subset of subcarriers is based on a node identifier that is unique to the particular node.

15. The tangible non-transitory computer readable medium according to claim 14, wherein the selected subset of subcarriers is further based on a time-varying component.

16. The tangible non-transitory computer readable medium according to claim 14, wherein the selected subset of subcarriers is further based on information contained within the multicast communication.

17. The tangible non-transitory computer readable medium according to claim 13, wherein an acknowledgement received from a particular node collides with transmissions of acknowledgements from the other of the plurality of nodes.

18. The tangible non-transitory computer readable medium according to claim 13, wherein the acknowledgements received from the a multicast communication are carrier signals on each of the subset of subcarriers.

* * * * *